Figure 1:
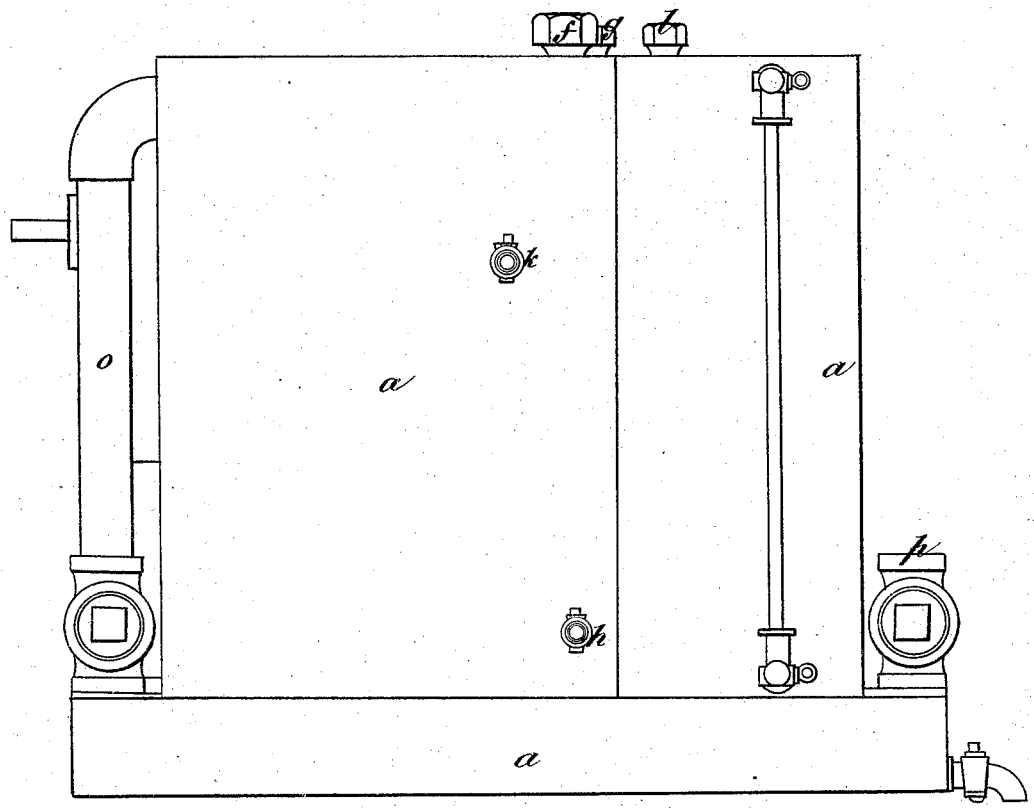

6 Sheets--Sheet 2.

F. G. VOIGT.
Apparatus for the Production of Gas from Hydrocarbon Liquids.

No. 160,799

Patented March 16, 1875.

Fig: 2.

F. G. VOIGT.
Apparatus for the Production of Gas from Hydrocarbon Liquids.

No. 160,799

6 Sheets--Sheet 5.

Patented March 16, 1875.

6 Sheets--Sheet 6.
F. G. VOIGT.
Apparatus for the Production of Gas from Hydrocarbon Liquids.
No. 160,799. Patented March 16, 1875.
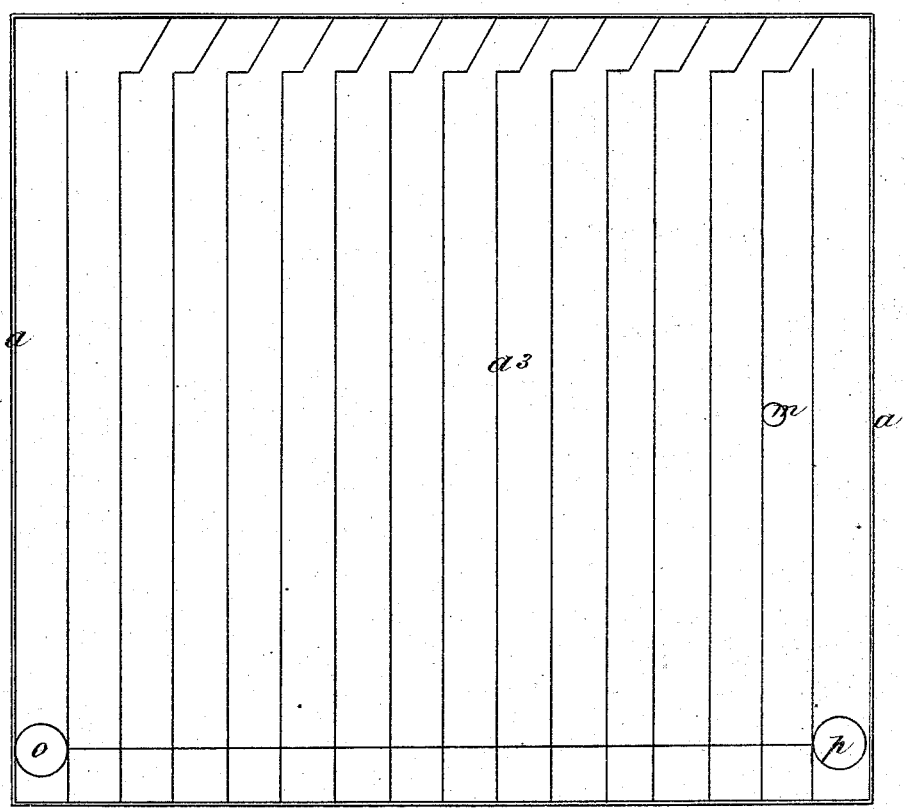
Fig: 6.

UNITED STATES PATENT OFFICE.

FREDERIC GUSTAV VOIGT, OF 36 GRAFTON ROAD, KENTISH TOWN, ENGLAND.

IMPROVEMENT IN APPARATUS FOR THE PRODUCTION OF GAS FROM HYDROCARBON LIQUIDS.

Specification forming part of Letters Patent No. 160,799, dated March 16, 1875; application filed June 3, 1874.

*To all whom it may concern:*

Be it known that I, FREDERIC GUSTAV VOIGT, of 36 Grafton Road, Kentish Town, in the county of Middlesex, England, a subject of the Emperor of Germany, have invented or discovered new and useful Improvements in Apparatus Used in the Production of Gas from Hydrocarbon Liquids; and I, the said FREDERIC GUSTAV VOIGT, do hereby declare the nature of the said invention, and in what manner the same is to be performed, to be particularly described and ascertained in and by the following statement thereof—that is to say:

This invention has for its object to improve the apparatus employed in the production of gas suitable for burning, for the production of light and heat, by the bringing of air into contact with hydrocarbon liquids. For the purpose of passing a stream of air into the gas-generator, I employ a rotary pump driven by clock-work, or by other mechanical means, the revolving air-vessel of which is divided into compartments, and it is partly immersed in hydrocarbon liquid. From the rotary pump the air passes into what I call the generator, in which is contained a uniform supply of hydrocarbon liquid, the generator being supplied with liquid by a bird-fountain arrangement from a reservoir, in which the supply of hydrocarbon liquid is contained. The generator is divided into numerous narrow compartments, which pass to and fro in a zigzag manner from side to side of the generator. In each compartment is also a horizontal partition, somewhat above the level of the liquid, in order that the air or partly-formed gas may first be caused to pass over the surface of the hydrocarbon liquid in each compartment, and afterward pass back along the upper division of such compartment without being in contact with the liquid, whereby time is given for the air and vapor taken up by it to more perfectly combine with one another. The air, after having thus been caused to pass in succession through the several chambers of the generator, is delivered into a gasometer or holder, which may be weighted to keep the gas at any desired pressure, as by reason of employing a revolving pump of the kind above described I can readily maintain a uniform stream of air at any required pressure through the apparatus; and in order that my invention may be fully understood and readily carried into effect, I have shown in the drawings hereunto annexed various views of apparatus constructed according to my invention.

Figure 2:
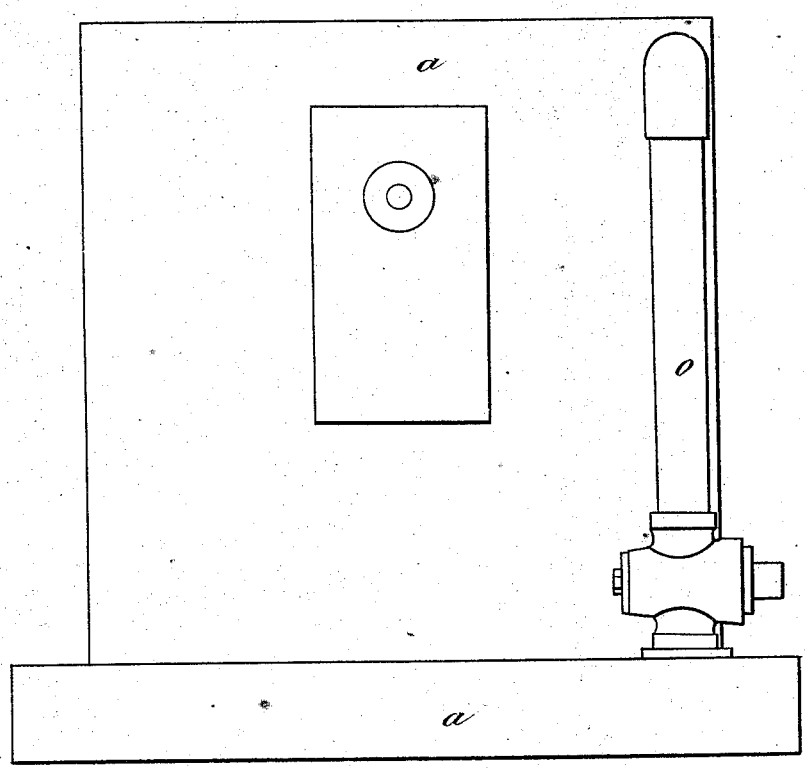
Figure 3:
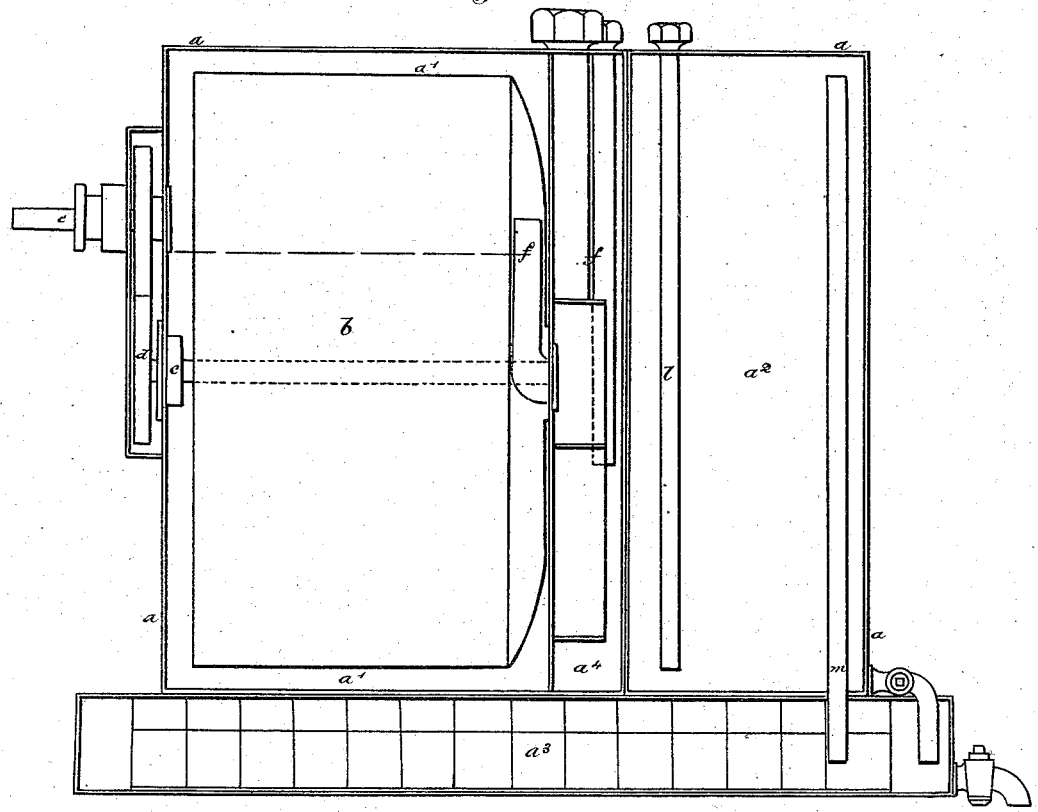
Figure 4:
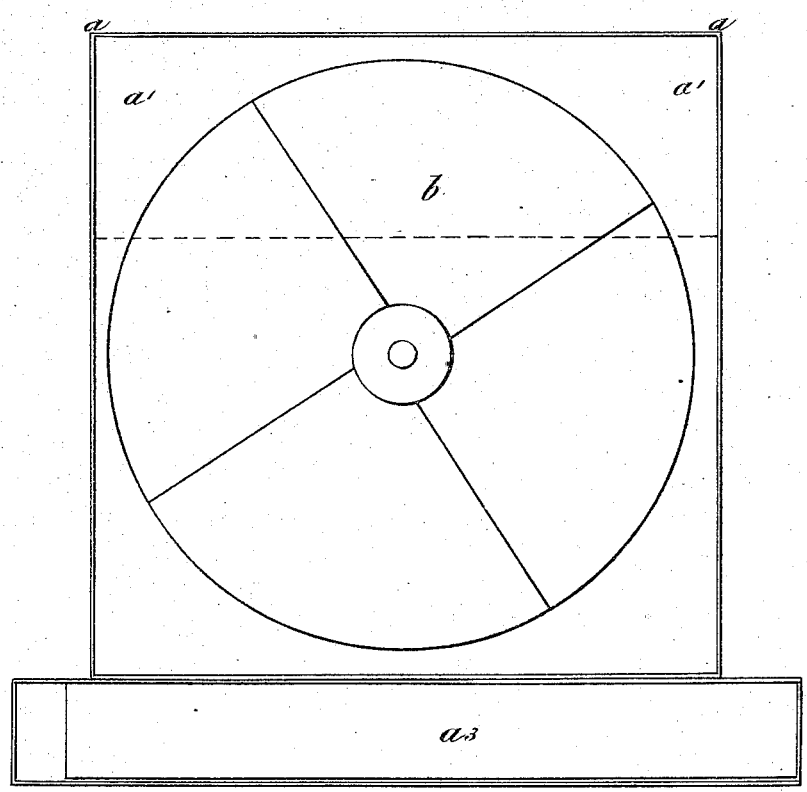
Figure 5:
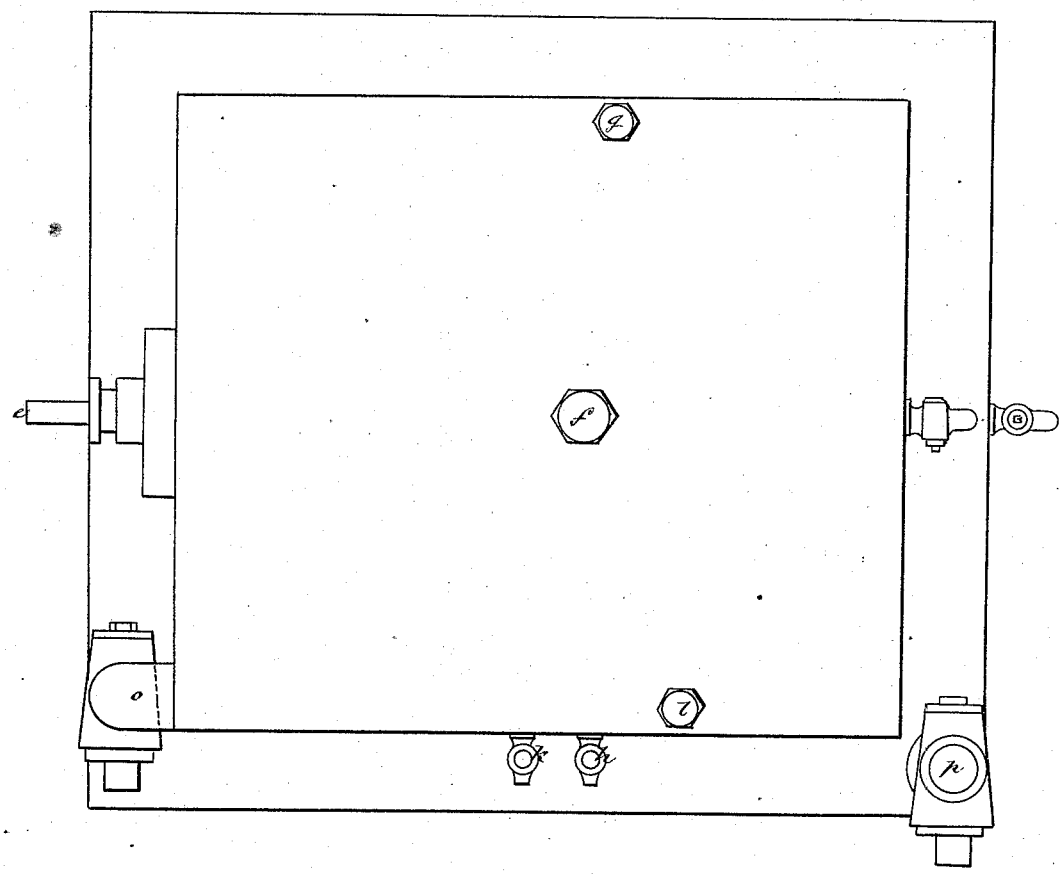

Figure 1 shows a side view of the apparatus; Fig. 2, an end view, and Figs. 3 and 4 vertical longitudinal and transverse sections, of the same. Fig. 5 is a plan view of the apparatus, and Fig. 6 a horizontal section taken through its lower part.

In these figures, $a\, a$ is the external casing. $b$ is the rotary air-vessel, divided into compartments. One end of the axis of this drum passes out from the casing $a$ through a stuffing-box, $c$, and has fixed upon it a toothed wheel, $d$, which gears with another toothed wheel on an axis, $e$, which may be driven by any suitable arrangement of clock-work actuated by a spring or weight, or other mechanical means. The casing $a$ is divided into three chambers. One chamber, $a^1$, contains the rotary air-vessel $b$, and is kept filled with hydrocarbon oil, by preference heavy oil, up to the level of the dotted line shown in the drawings, Figs. 3 and 4. Another chamber, $a^2$, serves as a reservoir or tank to contain a supply of hydrocarbon liquid. The third chamber, $a^3$, forms the generator, and has always a uniform depth of hydrocarbon liquid maintained in it by a bird-fountain arrangement from the supply-tank $a^2$. Between the chambers $a^1\, a^2$ is also a small chamber, $a^4$. The air-inlet pipe $f$, for conveying air to the compartments of the drum, passes down into the chamber $a^4$, and is led from thence into the chamber $a^1$, near to the center of the rotary air-vessel, and rises up through a hole formed in the center of its end cover until it comes above the level of the liquid in the chamber $a^1$. The space between the end cover of the air-vessel and its partitions or chambers is thus kept supplied with air, and as the vessel revolves the air passes from thence into the chambers as they emerge from the liquid, and is forced out from them at the opposite end of the air-vessel into the upper part of the chamber $a^1$ as the chambers are again submerged. The chamber $a$ may be supplied with liquid through the orifice $g$, and if any liquid should pass into the air-pipe $f$ it will pass from it to the bottom of the chamber $a^4$, and may be drawn off by the cock $h$. The cock $k$ serves to control the level to which the chamber $a^1$ may be filled. The supply-tank $a^2$ may be filled with liquid through the pipe $l$, and passes from it into the generator $a^3$ whenever the level of liquid in the generator gets below the bottom of the air-pipe $m$, so that air is free to pass from the generator to the top of the supply-tank.

I will now describe more fully the generator. It is divided, as shown in the horizontal section, Fig. 6, by vertical partitions, into numerous compartments, and each compartment is also divided by one, or it might be more, horizontal partitions, slightly above the level of the liquid in the generator. The air is conducted by the pipe $o$ from the upper part of the chamber $a$ into one end of the generator, and after passing along the first of its compartments passes from such compartment into the lower half of the second compartment, and after passing over the surface of the liquid therein rises up into the upper half of this second compartment, and after passing along it descends to the lower half of the third compartment, and so on in succession until it passes out as a combustible gas at the opposite end of the generator, and is led away by the pipe $p$ to the burners.

I would remark that the manner in which the generator is divided into compartments, and the manner in which the air or partly-formed gas is led from one compartment to another, may be greatly varied so long as the air or partly-formed gas is passed over the surface of hydrocarbon liquid in one compartment, then through another or more compartments not containing liquid, then again over the surface of the liquid, and so on in succession, in order to give time for the air and vapor taken up by it to combine with one another, whereby a more perfect gas will be produced than if the air were simply conducted through chambers each containing hydrocarbon liquid.

Having thus described the nature of my invention, and the manner of performing the same, I would have it understood that I claim—

1. The hereinbefore-described generator-chamber, consisting of the combination of a series of compartments to be partially filled with hydrocarbon liquid, and a series of separate mixing-chambers, these members being constructed and operating in combination, substantially as hereinbefore set forth, whereby the air is caused to pass first through one of the liquid-chambers, and over the surface of the liquid to take up vapor, then through an air-chamber to thoroughly commingle the vapor and air, then through a liquid-chamber again to take up more vapor, then through another mixing-chamber, and so on through the series.

2. The generator-chamber constructed, as hereinbefore set forth, with the liquid and mixing chambers, through which the air or partially-formed gas alternately passes, in combination with the air-vessel divided into compartments, and revolving within the chamber $a^1$, designed to be partially filled with hydrocarbon liquid, and the pipe $o$, connecting the chamber $a^1$ and the generator-chamber, for the purposes specified.

F. G. VOIGT.

Witnesses:
WILMER M. HARRIS,
JOHN DEAN,
*Both of No. 17 Gracechurch Street, London.*